(12) United States Patent
Dvorak et al.

(10) Patent No.: US 7,151,656 B2
(45) Date of Patent: Dec. 19, 2006

(54) ARC FAULT CIRCUIT INTERRUPTER SYSTEM

(75) Inventors: Robert F. Dvorak, Mt. Vernon, IA (US); Kon B. Wong, Cedar Rapids, IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/981,603

(22) Filed: Oct. 17, 2001

(65) Prior Publication Data

US 2003/0074148 A1    Apr. 17, 2003

(51) Int. Cl.
H02H 3/00      (2006.01)

(52) U.S. Cl. .......................................... 361/63; 702/58
(58) Field of Classification Search .................. 361/45, 361/79, 95, 80, 20, 63, 87, 78; 702/58; 324/522, 536
See application file for complete search history.

(56) References Cited

U.S. PATENT DOCUMENTS

| | | | | |
|---|---|---|---|---|
| 2,808,566 A | 10/1957 | Douma | ....................... | 324/127 |
| 2,832,642 A | 4/1958 | Lennox | ...................... | 299/132 |
| 2,898,420 A | 8/1959 | Kuze | ........................... | 200/87 |
| 3,471,784 A | 10/1969 | Arndt et al. | ................. | 324/126 |
| 3,538,241 A | 11/1970 | Rein | .......................... | 174/143 |
| 3,588,611 A | 6/1971 | Lambden et al. | ............. | 317/31 |
| 3,600,502 A | 8/1971 | Wagenaar et al. | .......... | 174/143 |
| 3,622,872 A | 11/1971 | Boaz et al. | .................... | 324/52 |
| 3,660,721 A | 5/1972 | Baird | ......................... | 361/55 |
| 3,684,955 A | 8/1972 | Adams | ........................ | 324/72 |
| 3,716,757 A | 2/1973 | Rodriguez | .................... | 317/40 |
| 3,746,930 A | 7/1973 | Van Best et al | ............. | 317/31 |
| 3,775,675 A | 11/1973 | Freeze et al. | ................. | 324/51 |
| 3,812,337 A | 5/1974 | Crosley | ................ | 235/153 AC |
| 3,858,130 A | 12/1974 | Misencik | ...................... | 335/18 |
| 3,869,665 A | 3/1975 | Kenmochi et al. | ............ | 324/72 |
| 3,878,460 A | 4/1975 | Nimmersjo | ................... | 324/52 |
| 3,911,323 A | 10/1975 | Wilson et al. | ................ | 317/18 |
| 3,914,667 A | 10/1975 | Waldron | ...................... | 317/36 |
| 3,932,790 A | 1/1976 | Muchnick | ................. | 317/18 D |
| 3,939,410 A | 2/1976 | Bitsch et al. | ................. | 324/72 |
| 4,052,751 A | 10/1977 | Shepard | ....................... | 361/50 |
| 4,074,193 A | 2/1978 | Kohler | ....................... | 324/126 |
| 4,081,852 A | 3/1978 | Coley et al. | .................. | 361/45 |

(Continued)

FOREIGN PATENT DOCUMENTS

CA    2256208    6/1999

(Continued)

OTHER PUBLICATIONS

Antonio N. Paolantonio, P.E., Directional Couplers, R.F. Design, Sep./Oct. 1979, pp. 40-49.

(Continued)

Primary Examiner—Stephen W. Jackson
Assistant Examiner—Boris Benenson

(57) ABSTRACT

A system for determining whether arcing is present in an electrical circuit in response to a sensor signal corresponding to current in the circuit includes a circuit for analyzing the sensor signal to determine the presence of broadband noise in a predetermined range of frequencies, and producing a corresponding output signal. A controller processes the sensor signal and the output signal to determine current peaks and rise times and to determine, using the current peaks and rise times and the presence of broadband noise, whether an arcing fault is present in the circuit, by comparing data corresponding to the current peaks and rise times and broadband noise with preselected data indicative of an arcing fault. The circuit for analyzing and the controller are integrated onto a single application specific integrated circuit chip.

40 Claims, 4 Drawing Sheets

U.S. PATENT DOCUMENTS

| | | | | |
|---|---|---|---|---|
| 4,087,744 A | 5/1978 | Olsen | | 324/51 |
| 4,115,828 A | 9/1978 | Rowe et al. | | 361/1 |
| 4,156,846 A | 5/1979 | Harrold et al. | | 324/158 |
| 4,166,260 A | 8/1979 | Gillette | | 335/20 |
| 4,169,260 A | 9/1979 | Bayer | | 340/562 |
| 4,214,210 A | 7/1980 | O'Shea | | 455/282 |
| 4,233,640 A | 11/1980 | Klein et al. | | 361/44 |
| 4,245,187 A | 1/1981 | Wagner et al. | | 324/54 |
| 4,251,846 A | 2/1981 | Pearson et al. | | 361/30 |
| 4,264,856 A | 4/1981 | Frierdich et al. | | 322/25 |
| RE30,678 E | 7/1981 | Van Zeeland et al. | | 361/44 |
| 4,316,187 A | 2/1982 | Spencer | | 340/664 |
| 4,344,100 A | 8/1982 | Davidson et al. | | 361/45 |
| 4,354,154 A | 10/1982 | Olsen | | 324/51 |
| 4,356,443 A | 10/1982 | Emery | | 324/51 |
| 4,358,809 A | 11/1982 | Blok | | 361/46 |
| 4,378,525 A | 3/1983 | Burdick | | 324/127 |
| 4,387,336 A | 6/1983 | Joy et al. | | 324/51 |
| 4,459,576 A | 7/1984 | Fox et al. | | 336/84 |
| 4,466,071 A | 8/1984 | Russell, Jr. | | 364/492 |
| 4,477,855 A | 10/1984 | Nakayama et al. | | 361/54 |
| 4,559,491 A | 12/1985 | Saha | | 324/52 |
| 4,587,588 A | 5/1986 | Goldstein | | 361/54 |
| 4,589,052 A * | 5/1986 | Dougherty | | 361/94 |
| 4,590,355 A | 5/1986 | Nomura et al. | | 219/125.12 |
| 4,616,200 A | 10/1986 | Fixemer et al. | | 335/35 |
| 4,639,817 A | 1/1987 | Cooper et al. | | 361/62 |
| 4,642,733 A | 2/1987 | Schacht | | |
| 4,644,439 A | 2/1987 | Taarning | | 361/87 |
| 4,652,867 A | 3/1987 | Masot | | 340/638 |
| 4,658,322 A | 4/1987 | Rivera | | 361/37 |
| 4,697,218 A | 9/1987 | Nicolas | | 633/882 |
| 4,702,002 A | 10/1987 | Morris et al. | | 29/337 |
| 4,707,759 A | 11/1987 | Bodkin | | 831/642 |
| 4,771,355 A | 9/1988 | Emery et al. | | 361/33 |
| H536 H | 10/1988 | Strickland et al. | | 324/456 |
| H538 H | 11/1988 | Betzold | | 89/134 |
| 4,792,899 A * | 12/1988 | Miller | | 323/317 |
| 4,810,954 A | 3/1989 | Fam | | 324/142 |
| 4,816,958 A | 3/1989 | Belbel et al. | | 361/93 |
| 4,833,564 A | 5/1989 | Pardue et al. | | 361/93 |
| 4,835,648 A | 5/1989 | Yamauchi | | 361/14 |
| 4,839,600 A | 6/1989 | Kuurstra | | 324/127 |
| 4,845,580 A | 7/1989 | Kitchens | | 361/91 |
| 4,847,719 A | 7/1989 | Cook et al. | | 361/13 |
| 4,853,818 A | 8/1989 | Emery et al. | | 361/33 |
| 4,858,054 A | 8/1989 | Franklin | | 361/57 |
| 4,866,560 A | 9/1989 | Allina | | 361/104 |
| 4,882,682 A | 11/1989 | Takasuka et al. | | 364/507 |
| 4,893,102 A | 1/1990 | Bauer | | 335/132 |
| 4,901,183 A | 2/1990 | Lee | | 361/56 |
| 4,922,368 A | 5/1990 | Johns | | 361/62 |
| 4,922,492 A * | 5/1990 | Fasang et al. | | 714/724 |
| 4,931,894 A | 6/1990 | Legatti | | 361/45 |
| 4,939,495 A | 7/1990 | Peterson et al. | | 337/79 |
| 4,949,214 A | 8/1990 | Spencer | | 361/95 |
| 4,969,063 A | 11/1990 | Scott et al. | | 361/93 |
| 5,010,438 A | 4/1991 | Brady | | 361/56 |
| 5,012,673 A * | 5/1991 | Takano et al. | | 73/118.1 |
| 5,032,744 A * | 7/1991 | Wai Yeung Liu | | 327/55 |
| 5,047,724 A | 9/1991 | Boksiner et al. | | 324/520 |
| 5,051,731 A | 9/1991 | Guim et al. | | 340/638 |
| 5,063,516 A | 11/1991 | Jamoua et al. | | 364/431 |
| 5,107,208 A * | 4/1992 | Lee | | 714/733 |
| 5,117,325 A | 5/1992 | Dunk et al. | | 361/93 |
| 5,121,282 A | 6/1992 | White | | 361/42 |
| 5,166,861 A | 11/1992 | Krom | | 361/379 |
| 5,168,261 A | 12/1992 | Weeks | | |
| 5,179,491 A | 1/1993 | Runyan | | 361/45 |
| 5,185,684 A | 2/1993 | Beihoff et al. | | 361/45 |
| 5,185,685 A | 2/1993 | Tennies et al. | | 361/45 |
| 5,185,686 A | 2/1993 | Hansen et al. | | 361/45 |
| 5,185,687 A | 2/1993 | Beihoff et al. | | 361/45 |
| 5,206,596 A | 4/1993 | Beihoff et al. | | 324/536 |
| 5,208,542 A | 5/1993 | Tennies et al. | | 324/544 |
| 5,223,795 A | 6/1993 | Blades | | 324/536 |
| 5,224,006 A * | 6/1993 | MacKenzie et al. | | 361/45 |
| 5,233,511 A | 8/1993 | Bilas et al. | | 364/146 |
| 5,257,157 A | 10/1993 | Epstein | | 361/111 |
| 5,280,404 A | 1/1994 | Ragsdale | | 361/113 |
| 5,283,708 A | 2/1994 | Waltz | | 361/93 |
| 5,286,933 A | 2/1994 | Pham | | |
| 5,307,230 A | 4/1994 | MacKenzie | | 361/96 |
| 5,334,939 A | 8/1994 | Yarbrough | | |
| 5,353,014 A | 10/1994 | Carroll et al. | | 340/638 |
| 5,359,293 A | 10/1994 | Boksiner et al. | | 324/544 |
| 5,363,269 A | 11/1994 | McDonald | | |
| 5,373,241 A | 12/1994 | Ham, Jr. et al. | | 324/536 |
| 5,383,084 A | 1/1995 | Gershen et al. | | 361/113 |
| 5,388,021 A | 2/1995 | Stahl | | 361/56 |
| 5,396,179 A | 3/1995 | Domenichini et al. | | 324/546 |
| 5,412,526 A | 5/1995 | Kapp et al. | | 361/56 |
| 5,414,590 A | 5/1995 | Tajali | | 361/669 |
| 5,420,740 A | 5/1995 | MacKenzie et al. | | 361/45 |
| 5,424,894 A | 6/1995 | Briscall et al. | | 361/45 |
| 5,432,455 A | 7/1995 | Blades | | 324/536 |
| 5,434,509 A * | 7/1995 | Blades | | 324/536 |
| 5,444,424 A | 8/1995 | Wong et al. | | 335/172 |
| 5,446,431 A | 8/1995 | Leach et al. | | 335/18 |
| 5,448,443 A | 9/1995 | Muelleman | | 361/111 |
| 5,452,223 A | 9/1995 | Zuercher et al. | | 364/483 |
| 5,459,630 A | 10/1995 | MacKenzie et al. | | 361/45 |
| 5,473,494 A | 12/1995 | Kurosawa et al. | | 361/3 |
| 5,477,150 A | 12/1995 | Ham, Jr. et al. | | 324/536 |
| 5,481,235 A | 1/1996 | Heise et al. | | 335/18 |
| 5,483,211 A | 1/1996 | Carrodus et al. | | 335/18 |
| 5,485,093 A | 1/1996 | Russell et al. | | 324/522 |
| 5,493,278 A | 2/1996 | Mackenzie et al. | | 340/638 |
| 5,506,789 A | 4/1996 | Russell et al. | | 364/492 |
| 5,510,946 A | 4/1996 | Franklin | | |
| 5,512,832 A | 4/1996 | Russell et al. | | 324/522 |
| 5,519,561 A | 5/1996 | Mrenna et al. | | 361/105 |
| 5,531,617 A | 7/1996 | Marks | | 439/723 |
| 5,546,266 A | 8/1996 | Mackenzie et al. | | 361/93 |
| 5,561,605 A | 10/1996 | Zuercher et al. | | 364/483 |
| 5,568,371 A | 10/1996 | Pitel et al. | | 363/39 |
| 5,578,931 A | 11/1996 | Russell et al. | | 324/536 |
| 5,590,010 A | 12/1996 | Ceola et al. | | 361/93 |
| 5,590,012 A | 12/1996 | Dollar | | 361/113 |
| 5,602,709 A | 2/1997 | Al-Dabbagh | | 361/85 |
| 5,608,328 A | 3/1997 | Sanderson | | 324/529 |
| 5,617,019 A | 4/1997 | Etter | | 324/117 |
| 5,638,244 A | 6/1997 | Mekanik et al. | | 361/62 |
| 5,657,244 A | 8/1997 | Seitz | | 364/492 |
| 5,659,453 A | 8/1997 | Russell et al. | | 361/93 |
| 5,682,101 A | 10/1997 | Brooks et al. | | 324/536 |
| 5,691,869 A | 11/1997 | Engel et al. | | |
| 5,701,110 A | 12/1997 | Scheel et al. | | 335/132 |
| 5,706,154 A | 1/1998 | Seymour | | 361/42 |
| 5,706,159 A | 1/1998 | Dollar, II et al. | | 361/113 |
| 5,726,577 A | 3/1998 | Engel et al. | | 324/536 |
| 5,729,145 A | 3/1998 | Blades | | 324/536 |
| 5,754,386 A | 5/1998 | Barbour et al. | | 361/154 |
| 5,764,125 A | 6/1998 | May | | 336/92 |
| 5,774,555 A * | 6/1998 | Lee et al. | | 381/4 |
| 5,784,020 A * | 7/1998 | Inoue | | 341/141 |
| 5,805,397 A | 9/1998 | MacKenzie | | 361/42 |
| 5,805,398 A | 9/1998 | Rae | | 361/42 |
| 5,815,352 A | 9/1998 | Mackenzie | | 361/42 |
| 5,818,237 A | 10/1998 | Zuercher et al. | | 324/536 |
| 5,818,671 A | 10/1998 | Seymour et al. | | 361/42 |
| 5,825,598 A | 10/1998 | Dickens et al. | | 361/42 |
| 5,834,940 A | 11/1998 | Brooks et al. | | 324/424 |
| 5,835,319 A | 11/1998 | Welles, II et al. | | 361/5 |

| | | | | | | |
|---|---|---|---|---|---|---|
| 5,835,321 | A | 11/1998 | Elms et al. ............ 361/45 | EP | 0649207 A1 | 4/1995 |
| 5,839,092 | A | 11/1998 | Erger et al. ........... 702/58 | EP | 0748021 A1 | 12/1996 |
| 5,847,913 | A | 12/1998 | Turner et al. .......... 361/93 | EP | 0762591 A2 | 3/1997 |
| 5,886,860 | A | 3/1999 | Chen et al. ............ 361/9 | EP | 0802602 A2 | 10/1997 |
| 5,886,861 | A | 3/1999 | Parry .................. 361/42 | EP | 0813281 A2 | 12/1997 |
| 5,889,643 | A | 3/1999 | Elms ................... 361/42 | EP | 1005129 | 5/2000 |
| 5,896,262 | A | 4/1999 | Rae et al. ............. 361/94 | GB | 227930 | 1/1925 |
| 5,905,619 | A | 5/1999 | Jha .................... 361/93 | GB | 865775 | 4/1961 |
| 5,933,305 | A | 8/1999 | Schmalz et al. ........ 361/42 | GB | 2177561 A | 6/1985 |
| 5,933,308 | A | 8/1999 | Garzon ................. 361/62 | GB | 2 241 396 A | 8/1991 |
| 5,933,311 | A | 8/1999 | Chen et al. ............ 361/106 | GB | 2285886 A | 7/1995 |
| 5,946,179 | A | 8/1999 | Fleege et al. .......... 361/93 | JP | 58 180960 | 10/1983 |
| 5,963,406 | A | 10/1999 | Neiger et al. .......... 361/42 | JP | 0158365 | 6/1989 |
| 5,999,384 | A | 12/1999 | Chen et al. ............ 361/42 | WO | WO 97/30501 | 8/1997 |
| 6,002,561 | A | 12/1999 | Dougherty .............. 361/42 | WO | WO 99/43065 | 8/1999 |
| 6,011,680 | A | 1/2000 | Solleder et al. ........ 361/90 | WO | WO 03/105303 A1 | 12/2003 |
| 6,031,699 | A | 2/2000 | Dollar, II et al. ...... 361/42 | | | |
| 6,054,887 | A * | 4/2000 | Horie et al. ........... 327/307 | | | |
| 6,088,205 | A | 7/2000 | Neiger et al. .......... 361/42 | | | |
| 6,097,884 | A * | 8/2000 | Sugasawara ............. 716/4 | | | |
| 6,185,732 | B1 * | 2/2001 | Mann et al. ............ 717/128 | | | |
| 6,242,922 | B1 * | 6/2001 | Daum et al. ............ 324/520 | | | |
| 6,246,556 | B1 | 6/2001 | Haun et al. ............ 361/42 | | | |
| 6,259,996 | B1 * | 7/2001 | Haun et al. ............ 702/58 | | | |
| 6,339,525 | B1 | 1/2002 | Neiger et al. .......... 361/42 | | | |
| 6,377,427 | B1 | 4/2002 | Haun et al. ............ 361/42 | | | |
| 6,414,829 | B1 | 7/2002 | Haun et al. ............ 361/42 | | | |
| 6,456,471 | B1 | 9/2002 | Haun et al. ............ 361/42 | | | |
| 6,477,021 | B1 | 11/2002 | Haun et al. ............ 361/42 | | | |
| 6,525,918 | B1 | 2/2003 | Alles et al. ........... 361/93 | | | |
| 6,532,424 | B1 | 3/2003 | Haun et al. ............ 702/58 | | | |
| 6,567,250 | B1 | 5/2003 | Haun et al. ............ 361/42 | | | |
| 6,570,392 | B1 | 5/2003 | Macbeth et al. ......... 324/536 | | | |
| 6,577,138 | B1 | 6/2003 | Zuercher et al. ........ 324/536 | | | |
| 6,621,669 | B1 | 9/2003 | Haun et al. ............ 361/42 | | | |
| 6,625,550 | B1 | 9/2003 | Scott et al. ........... 702/58 | | | |
| 2001/0033469 | A1 | 10/2001 | Macbeth et al. ......... 361/42 | | | |
| 2003/0072113 | A1 | 4/2003 | Wong et al. ............ 361/5 | | | |

FOREIGN PATENT DOCUMENTS

| | | |
|---|---|---|
| CA | 2256243 | 6/1999 |
| DE | 105100 | 6/1924 |
| DE | 195 15 067 | 2/1997 |
| DE | 196 01 884 A1 | 7/1997 |
| DE | 19633527 | 2/2001 |
| EP | 0094 871 A1 | 5/1983 |
| EP | 098119 B | 6/1986 |
| EP | 0615327 A2 | 9/1994 |
| EP | 07255110 | 3/1995 |

OTHER PUBLICATIONS

Alejandro Duenas, J., Directional Coupler Design Graphs For Parallel Coupled Lines and Interdigitated 3 dB Couplers, RF Design, Feb. 1986, pp. 62-64.

RV4145 Low Power Ground Fault Interrupter, Preliminary Product Specifications of Integrated Circuits, Raytheon Company Semiconductor Division, 350 Ellis Street, Mountain View CA 94309-7016, pp. 1-8.

Jean-Francois Joubert, Feasibility of Main Service Ground-Fault Protection On The Electrical Service To Dwelling Units, Consultants Electro-Protection Ins., 1980, Michelin St., Laval, Quebec H7L 9Z7. Oct. 26, 1990, pp. 1-77.

B.D. Russell, Detection Of Arcing Faults On Distribution Feeders, Texas A & M Research Foundation, Box H. College Station, Texas 77843, Final Report Dec. 1982, pp. 1-B18.

Preliminary Search Report dated Jul. 16, 2004 for application No. 01/16901.

Preliminary Search Report dated Jul. 15, 2004 for application No. 00/16481.

Preliminary Search Report dated Jul. 15, 2004 for application No. 00/16479.

Preliminary Search Report dated Jul. 15, 2004 for application No. 00/04956.

Supplementary European Search Report dated Feb. 25, 2005 for application No. EP 99 90 5523.

International Search Report dated Oct. 29, 2004 for application No. PCT/US2004/014829.

Supplementary European Search Report dated Jan. 14, 2005 for application No. EP 99 93 5468.

Supplementary European Search Report dated Jan. 14, 2005 for application No. EP 99 93 5468.

* cited by examiner

Fig. 1a
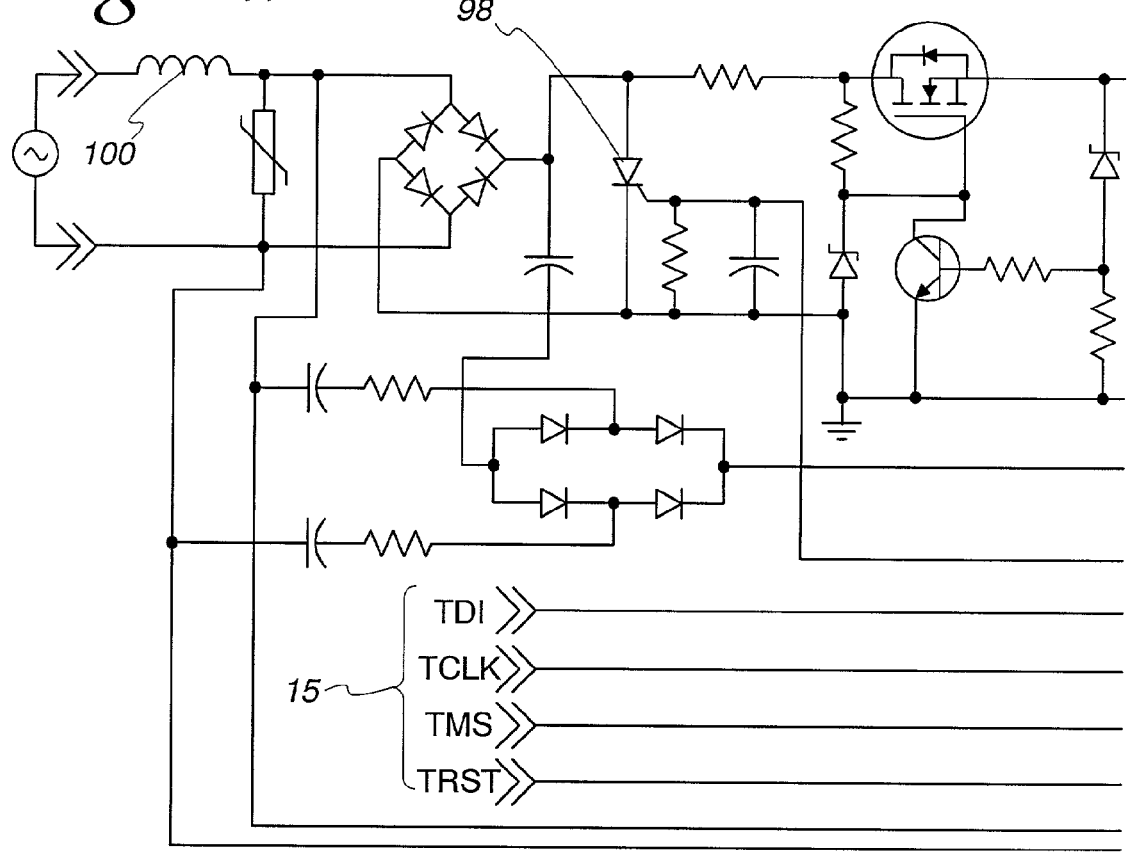
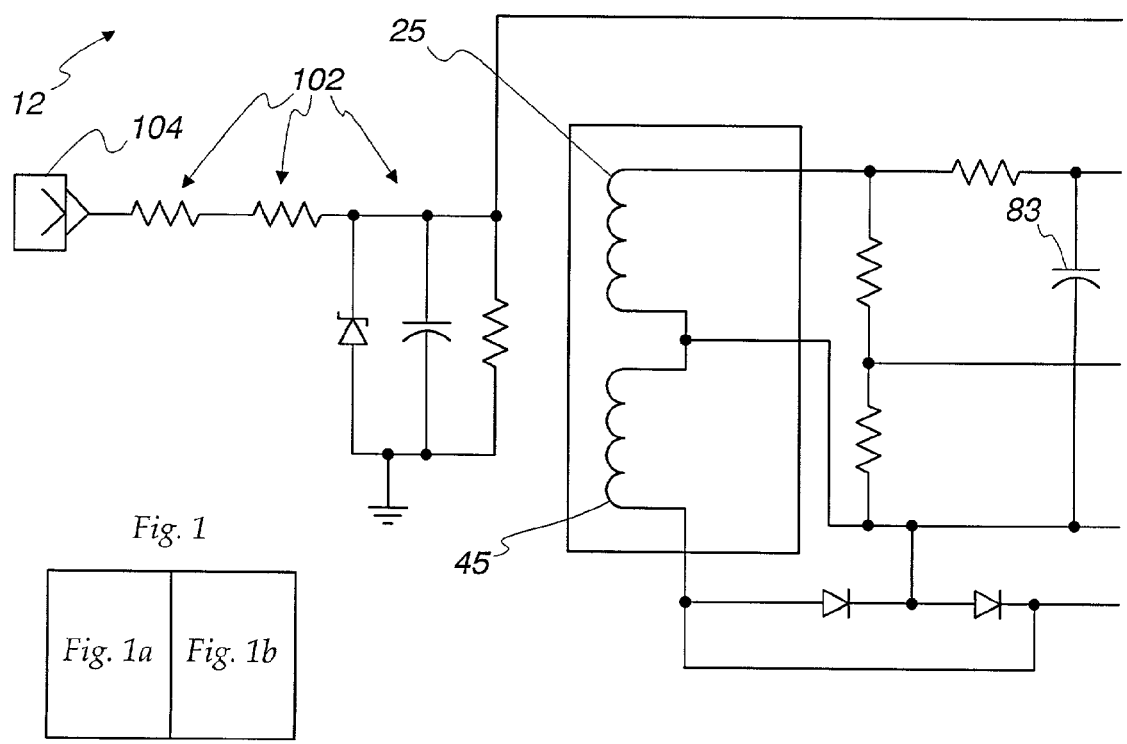
Fig. 1
| Fig. 1a | Fig. 1b |

ARC FAULT CIRCUIT INTERRUPTER SYSTEM

FIELD OF THE INVENTION

The present invention relates to the protection of electrical circuits and, more particularly, to the detection of electrical faults of the type known as arcing faults in an electrical circuit.

BACKGROUND OF THE INVENTION

The electrical systems in residential, commercial and industrial applications usually include a panelboard for receiving electrical power from a utility source. The power is then routed through protection devices to designated branch circuits supplying one or more loads. These overcurrent devices are typically circuit interrupters such as circuit breakers and fuses which are designed to interrupt the electrical current if the limits of the conductors supplying the loads are surpassed.

Circuit breakers are a preferred type of circuit interrupter because a resetting mechanism allows their reuse. Typically, circuit breakers interrupt an electric circuit due to a disconnect or trip condition such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector, between two conductors supplying a load, or between a conductor and ground. However, arcing faults may not cause a conventional circuit breaker to trip. Arcing fault current levels may be reduced by branch or load impedance to a level below the trip curve settings of the circuit breaker. In addition, an arcing fault which does not contact a grounded conductor or person will not trip a ground fault protector.

There are many conditions that may cause an arcing fault. For example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and/or cause the conductor to reach an unacceptable temperature.

OBJECTS AND SUMMARY OF THE INVENTION

It is an object of the present invention to provide an arc fault detection system and method which reliably detects arc fault conditions which may be ignored by conventional circuit interrupters.

Another object of the invention is to provide an arc fault detection system which utilizes a minimum number of highly reliable electronic signal processing components, such as a microcontroller, to perform most of the signal processing and analyzing functions, so as to be relatively simple and yet highly reliable in operation.

Other and further objects and advantages of the invention will be apparent to those skilled in the art from the present specification taken with the accompanying drawings and appended claims.

In accordance with one aspect of the invention, there is provided a system for determining whether arcing is present in an electrical circuit in response to a sensor signal corresponding to current in said circuit, said system comprising a circuit for analyzing said sensor signal to determine the presence of broadband noise in a predetermined range of frequencies, and producing a corresponding output signal, and a controller for processing said sensor signal and said output signal to determine current peaks and rise times and to determine, using said current peaks and rise times and the presence of broadband noise, whether an arcing fault is present in said circuit, by comparing data corresponding to said current peaks and rise times and broadband noise with preselected data indicative of an arcing fault, wherein said circuit for analyzing and said controller are integrated onto a single application specific integrated circuit chip.

In accordance with another aspect of the invention, there is provided a method for determining whether arcing is present in an electrical circuit in response to a sensor signal corresponding to current in said circuit, said method comprising, on a single application specific integrated circuit chip analyzing said sensor signal to determine the presence of broadband noise in a predetermined range of frequencies, and producing a corresponding output signal, and processing said sensor signal and said output signal to determine current peaks and rise times and to determine, using said current peaks and rise times and the presence of broadband noise, whether an arcing fault is present in said circuit, by comparing data corresponding to said current peaks and rise times and broadband noise with preselected data indicative of an arcing fault.

In accordance with another aspect of the invention, there is provided a system for determining whether arcing is present in an electrical circuit in response to a sensor signal corresponding to current in said circuit, said system comprising, on a single application specific integrated circuit chip, means for analyzing said sensor signal to determine the presence of broadband noise in a predetermined range of frequencies, and producing a corresponding output signal, and means for processing said sensor signal and said output signal to determine current peaks and rise times and to determine, using said current peaks and rise times and the presence of broadband noise, whether an arcing fault is present in said circuit, by comparing data corresponding to said current peaks and broadband noise with preselected data indicative of an arcing fault;

BRIEF DESCRIPTION OF THE DRAWINGS

In the drawings:

FIGS. 1a and 1b form a circuit schematic of an arc fault circuit interrupter system in accordance with the invention;

DETAILED DESCRIPTION OF THE ILLUSTRATED EMBODIMENT

This invention pertains to the use of a system on chip solution for arc fault detection primarily for use in circuit breakers or electrical outlet receptacles, or other electrical devices, typically but not limited to the 15 or 20 ampere size.

Figure 1B:
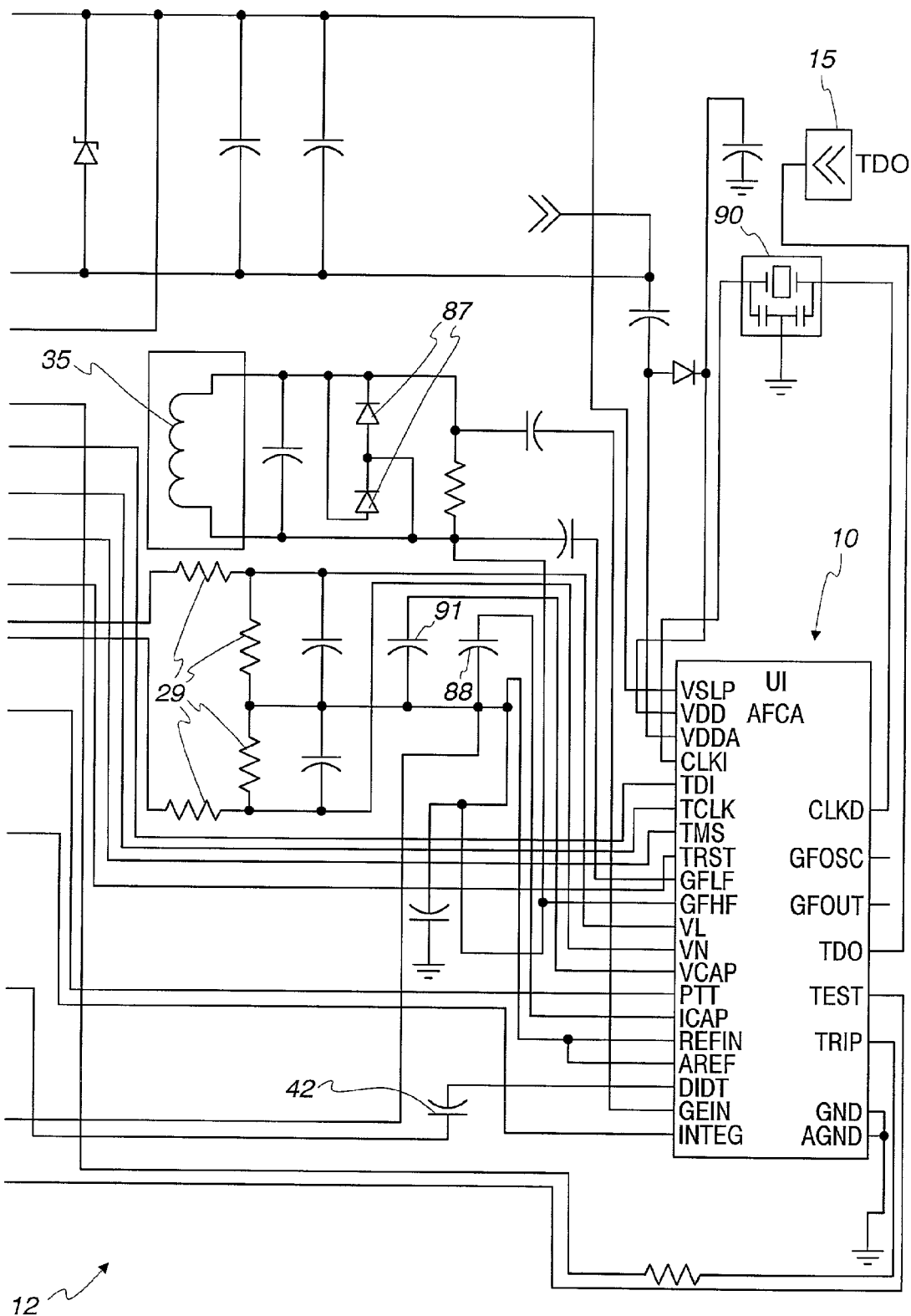

Referring to FIGS. 1a and 1b, this microchip 10, when incorporated on an electronic printed wiring board 12 with a minimum of external components, provides arc fault detection and tripping of the host wiring device.

Figure 2:
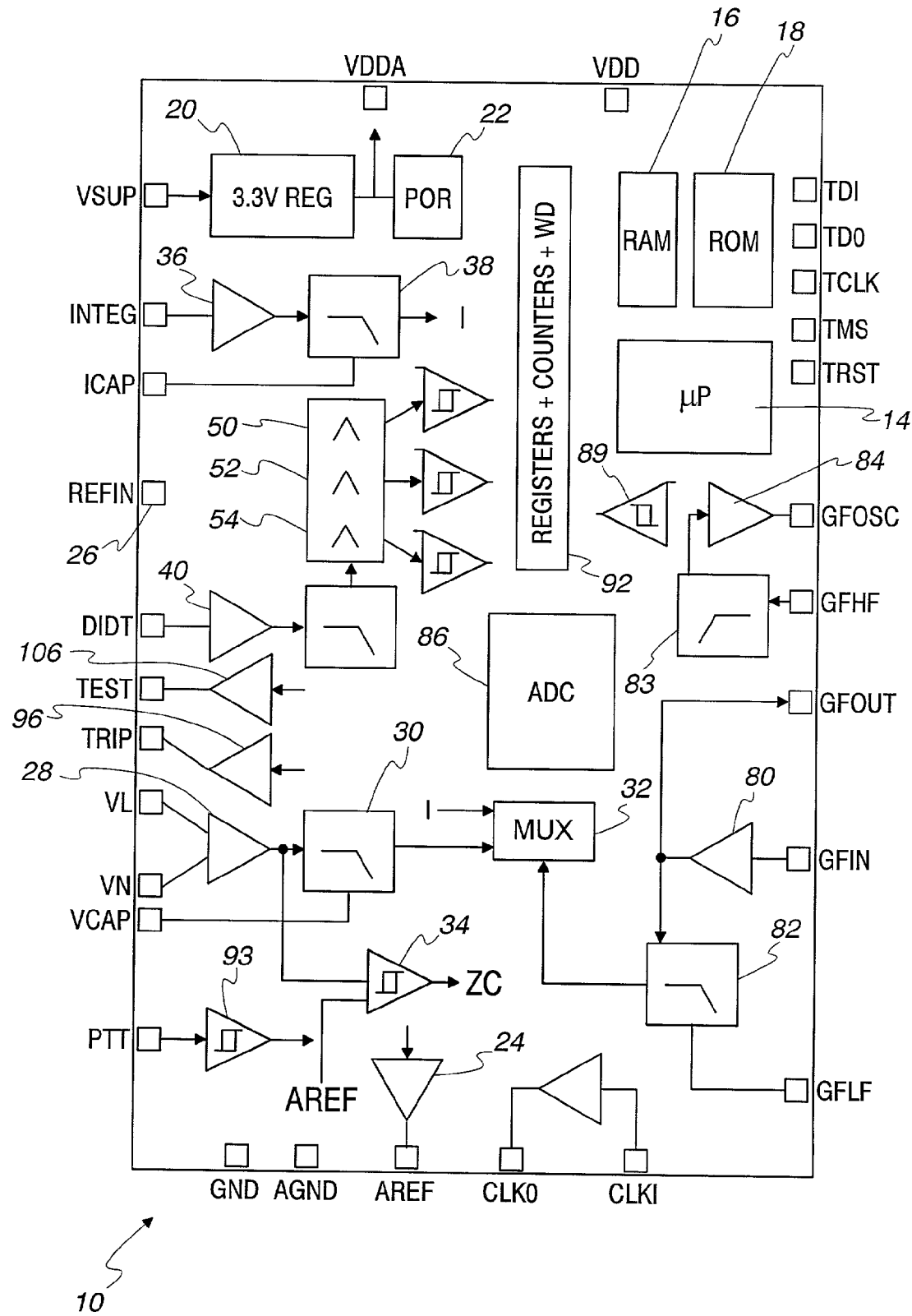
FIG. 2 is a functional diagram showing further details of an application specific integrated circuit chip which forms a part of a system of FIG. 1.

The system on chip is an application specific integrated circuit which combines analog and digital signal processing on a single microchip. A block diagram is shown in FIG. 2.

The "system on chip" 10 monitors line voltage and current in the host device and analyzes them for the presence of an arc fault. If certain arc detection criteria are met as determined by an arcing algorithm embedded within the software of a microcontroller's 10 memory 18, the chip signals an external SCR98 causing it to disconnect the device from the load.

The ASIC generally includes a processor or microcontroller 14, memories, amplifier stages, filters, A/D converter, analog multiplexer, a voltage regulator and power on reset circuit. The tasks of the ASIC are: measure line voltage, detect voltage zero crossings, measure 60 Hz line current, measure ground fault current, detect ground loops (grounded neutral) in neutral line, detect high frequency components of line current, provide voltage regulation for all ASIC circuits, detect presence of a signal to commence self test, generate a self test high frequency current source, provide undervoltage reset (POR) for the microcontroller, provide a trip signal to fire a trip solenoid driver, provide a watchdog to reset the microcontroller, and make a trip decision based on embedded code in the microcontroller.

The ASIC can operate in two different modes:

The "normal" mode corresponds to the mode where the processor 14 is the master. In normal mode, the microprocessor controls the data conversion rate (A-to-D), counters, interruptions and data memories. The microprocessor executes code stored in a ROM memory. Moreover, the microprocessor controls the activity of all analog blocks by forcing "power down" signal in order to limit the power dissipation. This mode is the normal operation mode of the ASIC.

The "slave" mode corresponds to the mode where the processor 14 is the slave and is controlled by a standard communication channel (e.g., a JTAG) interface or port 15 (see FIGS. 1a and 1b). Two main operations can be done in this mode using the JTAG interface 15: debug mode, and register values and data transfer. The JTAG port can be used to couple a personal computer (PC) or other external processor to the ASIC, using the processor 14 of the ASIC as a slave processor. This permits interrogation of the ASIC counters, registers, etc. as well as rewriting to memories, registers, etc. of the ASIC. The JTAG ports 15 include data in/out ports (TDI, TDO), and reset (TRST), clock (TCLK) and mode select (TMS) ports.

The processor 14, in one embodiment, is the ARM7TDMI from ARM company. The ARM has a boundary scan circuit around its interface which is used for production test or for connection to an in-circuit emulator (ICE) interface (i.e., the JTAG) for system and software debugging. The JTAG interface is accessible via the pins TDI, TDO, TMS, TCK and TRST and behaves as specified in the JTAG specification.

The processor is 32 bit wide and has a CPU frequency of 4 MHz. An external resonator 90 (FIG. 1b) has a frequency of 8 MHz which is divided by two for the CPU. The microprocessor analyzes the current, ground fault and di/dt signals and by means of an arc detection algorithm makes a trip decision, using the presence of broadband noise and the current peaks and rise time (di/dt). One such algorithm is described in U.S. Pat. No. 6,259,996, issued Jul. 10, 2001 to which reference is invited. While the line voltage is fed to the microprocessor, it may be optionally used by the algorithm to effect various levels of arc detection as dictated by the embedded software. The microprocessor uses the zero crossing signal to synchronize the arc detection algorithm with line voltage.

There are different clock domains in the ASIC: A clock for the ARM, the bus controller and the memories. The microprocessor clock frequency is 4 MHz. Clocks for the peripherals (counters, watchdog, ADC, BP filters) are 4 MHz, 1 MHz and 250 KHz frequencies. These clocks are fixed and derived from the ARM clocks.

There are two memory domains. The program memory, which contains the software for the ARM operation, the program memory space contains a 10 kb ROM (2560 words of 32 bits), and the program memory start address is 0000:0000hex. The data memory 16 contains the program data and consists of two RAMs of 128 bytes×16 bits for a total of 512 bytes. The memory access can be 32 bits or 16 bits wide. The ARM selects the access mode. The data memory start address is 0004:0000hex. In addition to the memories, the processor can also access registers. The register memory start address is 0008:0000hex.

The various functional blocks (see FIG. 2) and their respective operation is described briefly below:

A 3.3V regulator 20 provides a finely regulated DC power source for use by the analog and digital sections of the chip. The input to the chip need only be roughly regulated to within coarse limits, for example 4 to 7 volts.

The POR or power on reset circuit 22 senses the chip's regulated voltage supply and holds the microcontroller in a reset state if the voltage is below a safe operating limit.

The analog reference circuit (AREF) 24 provides a reference point for the input signals at the midpoint of the analog power supply to allow the amplified signals to swing both positive and negative. The AREF is externally connected to the REFIN pin 26.

A Vl/Vn differential amplifier 28 differentially measures line voltage at the terminals of the host device via an externally located voltage divider 29 (FIG. 1b). The voltage signal is low pass filtered as shown at the low pass filter block 30 to remove high frequency noise or harmonics and to provide anti-aliasing. The filtered signal is sent to a first channel of a multiplexer 32 and also to the input of a zero crossing detector 34. The output voltage at VCAP pin and an external capacitor 91 (FIG. 1b) provides an anti-aliasing low-pass filter (LPF) for the A/D converter 86. The typical differential input range at the inputs is +/−0.65V.

A comparator 34 at the output of the line voltage differential amplifier 28 detects zero crossings (ZC) in the line voltage for use in synchronizing an arc detection algorithm.

An amplifier 36 at the INTEG input amplifies the externally integrated output of a di/dt sensor before it is lowpass filtered 38 for anti-aliasing and sent to a second channel of the multiplexer 32 previously referenced.

The output of a di/dt sensor 25 (see FIG. 1) monitoring line current through the host device is connected to the input of a di/dt amplifier 40 after first being high pass filtered by filter capacitors 42 (FIG. 1b) to remove the 60 Hz component. The di/dt signal is amplified at amplifier 40 and sent to the input of three bandpass filters 50, 52, 54. Broadband noise in the 10 KHz to 100 KHz range appearing at the DIDT input is one indicator of the presence of arcing.

Figure 3:
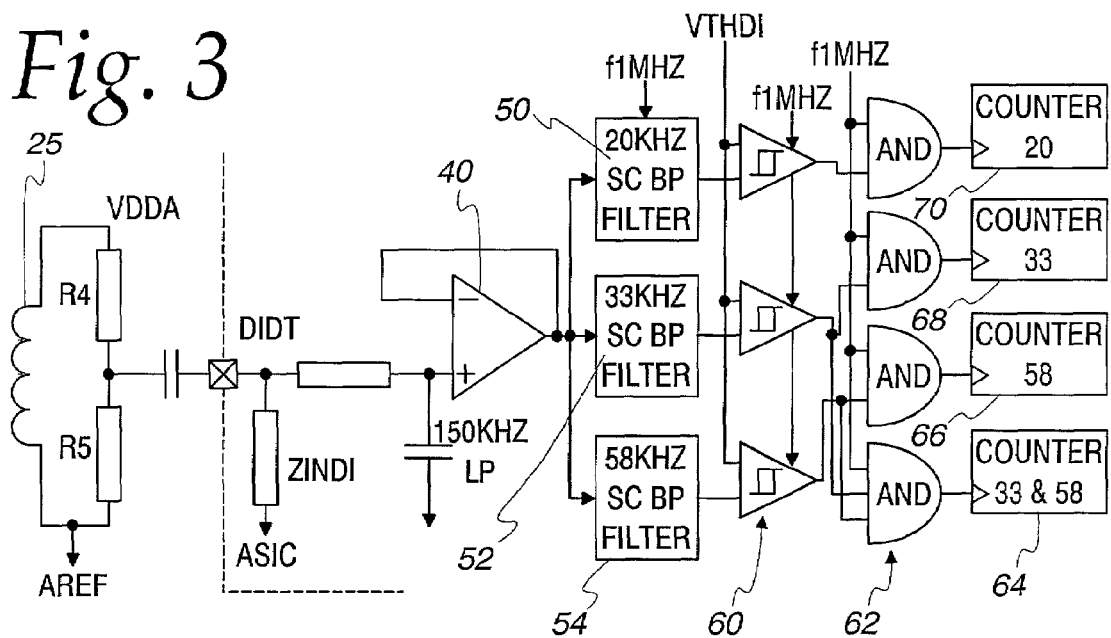
FIG. 3 is a functional block diagram illustrating operation of a digital circuit portion of the chip of FIG. 2.

FIG. 3 shows a more detailed block diagram of the di/dt sensing system. Three switched cap (SC) bandpass filters (BPF) 50, 52, 54 set respectively at 20, 33 and 58 KHz, filter the di/dt signal to determine if there is broadband noise in the line current. The 20 KHz filter 50 is provided for added flexibility in future arc detection devices. The output of the filters is monitored by a set of comparators 60 whose outputs change state when a predetermined threshold is exceeded. The microprocessor 14 (FIG. 2) monitors the state of each filter's comparator individually and also the logically ANDed output at AND gates 62 of the 33 and 58 KHz filters to determine the presence of broadband noise. The comparator 60 outputs and the AND gates 62 are synchronized by the same clock (f=1 MHz) as the switched capacitor bandpass filters 50, 52 54. It should be noted that the ANDing of the comparator outputs with the clock insures that the components of high frequency in the passbands of both the 33 KHz and 58 KHz filters must be simultaneously present and of sufficient amplitude in order to be considered broadband noise and therefore be counted by the 33/58 counter. Separate counters are provided for future use, for counting the components in the passbands of the 20 KHz, 33 KHz and 58 KHz BPF's, respectively.

The ASIC provides an amplification of the di/dt input signal and performs analog signal processing. As described above, the signal going through three independent switched-cap bandpass filters (BP) (20, 33 and 58 KHz) is compared to a fixed threshold reference voltage in both directions (positive and negative). The 20 KHz BP has a typical quality factor Q of 4. Both 33 and 58 KHz BP have typical Q of 8. The outputs of the comparators control separate counters. The ANDed boolean combination of 33 and 58 KHz BP comparator outputs controls a $4^{th}$ counter as shown in FIG. 3. All comparator outputs are synchronized on the switched-cap clock (1 MHz) and are stable during each period of 1 μs. The counters can be reset or disable by software. An anti-aliasing filter is placed in the first stage. The cut-off frequency is typically 150 KHz. The sampling clock frequency of bandpass filters is $F_{1MHz}$. Clamping anti-parallel diodes are placed between AREF and DIDT pins internal to the ASIC.

The Z-domain function of the switched-cap bandpass filters can be described by the following expression:

$$Y_1 = a(X_i - X_{i-1}) - b\,Y_{i-1} - c\,Y_{i-2}$$

Where $X_i$ and $Y_i$ are, respectively, the $i^{th}$ samples of input and output voltages and a, b and c are the filter coefficients.

| Coefficient of normalized BP | 20 KHz | 33 KHz | 58 KHz |
| --- | --- | --- | --- |
| a | 0.031 | 0.026 | 0.047 |
| b | −1.953 | −1.932 | −1.825 |
| c | 0.969 | 0.974 | 0.952 |

The output of a ground fault sensing transformer 35 (FIG. 1b) is connected to the input of a GFIN amplifier 80 (FIG. 2), which has a high gain to amplify the small output from the sensor. The ground fault signal is amplified and lowpass filtered (82) (FIG. 2) for anti-aliasing before being fed to the third channel of the multiplexer 32 (FIG. 2).

Figure 4:
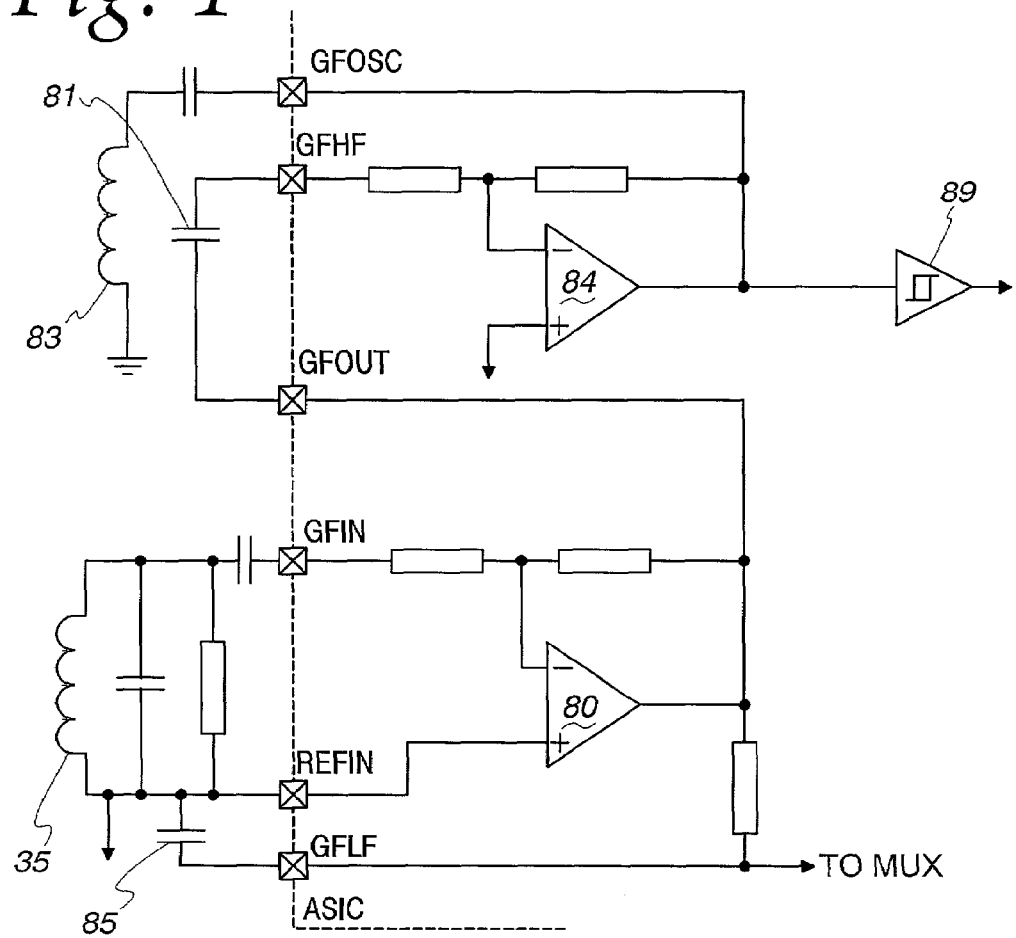
FIG. 4 is a circuit schematic of a signal processing circuit which forms a part of the chip of FIG. 1b.

Referring also to FIG. 4, this circuit performs an amplification and anti-aliasing low pass (LP) filtering of the ground fault (GF) input voltage before A-toD conversion and provides high pass (HP) filtering and amplification for the grounded neutral detection at pin GFOSC. The first gain stage 80 is a current-to-voltage converter providing signal for both low and high pass filters 82, 83 (FIG. 2). The 3 dB bandwidth of the high pass filter will be typical 15 KHz. The LP and HP filters are made by internal resistors and external capacitors 81 and 85 respectively. Clamping anti-parallel diodes 87 (see FIG. 1b) are placed between AREF and GFIN pins for transient protection.

The chip 10 has provision for personnel level ground fault protection when provided with a 5 mA grounded neutral sensing transformer 83 (FIG. 4) as well as the ground fault transformer 35 (FIG. 4). To make this feature functional, the output GFOUT may be coupled by means of a capacitor 81 to the input of GFHF. GFOSC is then capacitively coupled to the winding of the neutral sensing transformer 83. When thus connected, this forms a dormant oscillator neutral detection system, including second opamp 84 and comparator 89. The function of the second amplifier 84 at GFHF is to provide the total loop gain necessary to put the dormant oscillator into oscillation when a sufficiently low resistance grounded neutral condition exists.

The multiplexer 32 (FIG. 2) alternately selects between the three channel inputs, i.e., current, line voltage or ground fault and passes the selected signal to the input of an analog to digital (A/D) converter (ADC) 86 (FIG. 2). The analog to digital converter 86 is a single channel sigma delta converter which alternately digitizes the current, line voltage and ground fault signals for analysis by the microprocessor.

The line current signal at ASIC pin INTEG is obtained by an external low-pass filter 83 placed in the output of the di/dt coil 25 (FIG. 1a). The ASIC amplifies the INTEG signal. An anti-aliasing LP filter is obtained by an external capacitor 88 (FIG. 1b) placed at ICAP pin before A-to-D conversion stage.

The watchdog (WD) 92 monitors the operation of the ARM microprocessor 14. If the software does not reset the watchdog counter at periodic times, the watchdog generates a hard reset of the microprocessor. Alternately, it could be used to cause a trip condition. The watchdog is based on a 15 bit wide periodic counter which is driven by the 250 KHz clock. The counter is reset by software with the WDG_RST address. Writing a 1 on this address resets the counter. As noted, the watchdog must be reset only in a specific time window, otherwise a hard reset is generated. If the watchdog is reset before the counter reaches 2^14 or if the counter is not reset before the counter reaches 2^15, the watchdog reset is generated for the ARM and for the WD counter.

To allow the ARM to check the watchdog value, the MSB (bit 14) can be read and if the value is 1, the processor must reset the counter.

When the watchdog generates a reset, a specific register is set to indicate that a watchdog reset has occurred. This register value can be read even after the reset.

When a trip decision is reached, a trip signal buffer 96 latches and drives the gate of an SCR 98 of an external firing circuit (FIG. 1a). In order to conserve stored energy during the trip sequence, the microprocessor is halted and portions of the analog circuitry are disabled. The SCR 98 is connected in series with a trip coil 100. In the ON state, the SCR 98 causes the coil 100 to be momentarily shorted across the line to mechanically de-latch the contacts of the host device and to subsequently interrupt flow of current.

The push to test (PTT) circuit 102 monitors the status of a push to test (PTT) button 104. When the push to test button is depressed, line voltage is applied through an external voltage divider in circuit 102 to the PTT input of the chip 10. The circuit senses that a system test is being requested and signals the microprocessor to enter a test mode. The activation of the test button 104 (not part of the ASIC) is detected by the PTT comparator 93 (FIG. 2) as a voltage at a PTT (Push-to-Test) pin.

With the microprocessor in the test mode, test signal buffer 106 acts as a current source driving a test winding 45 (FIG. 1a) of the di/dt sensor with a sharply rising and falling edge square wave at each of the center frequencies of the bandpass filters, namely 20 KHz (when used), 33 KHz and 58 KHz in turn.

TABLE 1 below briefly describes each pin of the ASIC 10.

| Name | Type | Description |
| --- | --- | --- |
| VSUP | Power | High positive ASIC supply voltage |
| VDDA | Power | Analog positive ASIC supply voltage and regulator output |
| VDD | Power | Digital positive ASIC supply voltage (input) |
| AGND | Power | Analog ground |
| GND | Power | Digital ground |
| INTEG | Analog | Input for Current measurement |
| ICAP | Analog | Input for LP filter |
| REFIN | Analog | Input sense of reference voltage |
| AREF | Analog | Analog reference output |
| DIDT | Analog | Input for DIDT measurement |
| TEST | Analog | Test output signal |
| TRIP | Analog | Trip output signal |
| VL | Analog | Input for voltage measurement |
| VN | Analog | Input for voltage measurement |
| VCAP | Analog | Input for LP filter |
| PTT | Analog | PTT Input signal |
| CLKI | Analog | Input clock of quartz |
| CLKO | Analog | Output clock of quartz |
| GFIN | Analog | Input signal for GF measurement |
| GFOUT | Analog | Output of gain stage |
| GFLF | Analog | Input for LP filter |
| GFHF | Analog | Input for HP filter |
| GFOSC | Analog | Output of GF dormant gain stage |
| TDI | Digital - in | Data in |
| TDO | Digital - out | Data out |
| TCLK | Digital - in | Clock in |
| TMS | Digital - in | Select in |
| TRST | Digital - in | Reset in (active low) |

Additional Operational Description

The ground fault detection feature's primary purpose is to detect arcing to ground, in the incipient stages of arcing, where a grounding conductor is in the proximity of the faulty line conductor. Such detection and tripping can clear arc faults before they develop into major events. As discussed earlier, by the use of appropriate ground fault and neutral sensing transformers, this feature can be used to provide personnel protection as well as arc to ground detection.

When the pust to test button 104 is depressed, line voltage is applied to push to test circuit 102 in such a way as to cause ground fault current to flow through the ground fault sensing transformer 83 and simultaneously force the microcontroller 14 into the test mode as described previously. The microprocessor monitors the output of both the ground fault detection circuitry and the output of the bandpass filters (caused by the test buffer driving the test winding) to determine if the bandpass filter detection circuitry is functional. Only if counters 66 and 68 have sufficiently high counts and sufficiently high ground fault signal peaks are present, will a trip signal be given.

A calibration routine allows the microprocessor 14 to compensate for the offset voltages generated by each of the operational amplifiers in the line voltage, current and ground fault measurement circuits. Immediately following power up and at periodic intervals (to update the data, e.g., to compensate for thermal drift), the microprocessor initiates a calibration procedure. During this time period, the line voltage and current measurement circuits are internally disconnected from their respective input terminals and each of the operational amplifiers is connected in turn to analog reference voltage (AREF) 24. The respective offset voltages (one for each op amp) are then read by the microprocessor and their values are stored in memory. The stored offset voltages are subtracted from the measured signal values by the software. The ground fault offset is measured by internally shorting the first stage amplifier (80) gain setting resistors and reading the offset voltage on an external AC coupling capacitor directly from the input. The software subtracts this value from the measured signal value.

Residential type circuit breakers incorporating arc fault circuit protection require a very small printed wiring board with low power dissipation. Arc fault circuit interruption requires significant analog and digital signal processing in order to reliably distinguish between arc faults and electrically noisy loads, such as arcs from light switches and universal motors. In a previous embodiment, such processing was achieved using a separate analog ASIC (application specific integrated circuit) and a microcontroller.

The system on chip design provides a reduced package size, approximately ⅓ reduction, as well as a reduction in external components required. The combination of reduced parts and part placement results in a significant cost reduction and ease of assembly. Bandpass filter performance is more consistent, offset voltage correction is improved, test circuit performance is improved, and ground fault personnel protection can be provided.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for determining whether arcing is present in an electrical circuit in response to a sensor signal corresponding to current in said circuit, said system comprising:

a circuit for analyzing said sensor signal to determine the presence of broadband noise in a predetermined range of frequencies, and producing a corresponding output signal; and a controller for processing said sensor signal and said output signal to determine current peaks and current rise time and to determine, using said current peaks and rise times and the presence of broadband noise, whether an arcing fault is present in said circuit, by comparing data corresponding to said current peaks and rise times and broadband noise with preselected data indicative of an arcing fault;

wherein said circuit for analyzing and said controller are integrated onto a single application specific integrated circuit chip (ASIC) and said circuit for analyzing includes at least two bandpass filters having different passbands, and a set of comparators for monitoring outputs of said bandpass filters, said comparators having outputs which change state when a predetermined threshold is exceeded, said circuit further including at least one counter which is incremented in response to components of high frequency in the pass bands of at least two of said bandpass filters which are simultaneously present.

2. The system of claim 1 wherein the controller includes a plurality of counters and increments said plurality of counters in response to said sensor signal and said output signal, and periodically determines whether an arcing fault is present by monitoring said plurality of counters and comparing counts in said counters with one or more preselected counts indicative of an arcing fault.

3. The system of claim 2 wherein said counters are implemented in software.

4. The system of claim 1 wherein said integrated chip further includes an onboard voltage regulator for providing regulated DC voltage supplies for all of the analog and digital circuits on said integrated circuit chip.

5. The system of claim 1 wherein said controller comprises a microprocessor.

6. The system of claim 1 wherein said bandpass filters are switched capacitor bandpass filters, and further including at least one AND gate synchronized with said switched capacitor bandpass filters for ANDing said comparator output to said counter.

7. The system of claim 1 wherein said circuit comprises a plurality of operational amplifiers, and wherein said controller further is operative for coupling each of said operational amplifiers with an analog reference voltage, reading an offset voltage of said operational amplifier and storing the value of said offset voltage in a memory, and thereafter subtracting said offset voltage values from measured signal values for each of said operational amplifiers.

8. The system of claim 1 wherein said controller produces a trip signal in response to a determination that an arcing fault is present, and further latches said trip signal until reception of a reset signal.

9. The system of claim 8 wherein said controller powers down the other circuits on said integrated circuit chip when said trip signal is given, using stored energy to maintain the trip signal.

10. The system of claim 1 wherein said integrated circuit chip includes three channels, a muliplexer for selecting each channel, and a single channel analog-to-digital converter for receiving and converting a signal on the channel selected by said multiplexer.

11. The system of claim 1 wherein said integrated circuit chip further includes circuits for forming, together with an external sensor, a dormant oscillator neutral detection system for detecting a grounded neutral.

12. The system of claim 11 wherein said circuits for forming a dormant oscillator neutral detection system includes a first amplifier for comparing a ground fault input signal from said external sensor to a reference, and a second amplifier coupled in series with said first amplifier for providing sufficient loop gain to put the dormant oscillator into oscillation in response to a grounded neutral condition.

13. The system of claim 1 and further including, on said ASIC, a port for bi-directional exchange of data between said ASIC and an external processor.

14. A method for determining whether arcing is present in an electrical circuit in response to a sensor signal corresponding to current in said circuit, said system comprising, on a single application specific integrated circuit chip:

analyzing said sensor signal to determine the presence of broadband noise in a predetermined range of frequencies, and producing a corresponding output signal, wherein said analyzing includes passing said sensor signal through at least two bandpass filters having different passbands, and monitoring outputs of said bandpass filters, with comparators having outputs which change state when a predetermined threshold is exceeded;

processing said sensor signal and said output signal to determine current peaks and rise times and to determine, using said current peaks and rise times and the presence of broadband noise, whether an arcing fault is present in said circuit, by comparing data corresponding to said current peaks and rise times and broadband noise with preselected data indicative of an arcing fault; and incrementing at least one counter in response to the simultaneous presence of components of high frequency in the pass bands of at least two of said bandpass filters.

15. The method of claim 14 including incrementing a plurality of counters in response to said sensor signal and said output signal, and periodically determining whether an arcing fault is present by monitoring said plurality of counters and comparing counts in said counters with one or more preselected counts indicative of an arcing fault.

16. The method of claim 15 wherein said counters are implemented in software.

17. The method of claim 14 further including providing regulated DC voltage supplies for all of the analog and digital circuits on said integrated circuit chip, using an onboard voltage regulator.

18. The method of claim 14 wherein said processing is performed by a microprocessor.

19. The method of claim 14 and further including synchronizing at least one AND gate with said bandpass filters for ANDing said comparator outputs.

20. The method of claim 14 further including coupling each of a plurality of operational amplifiers with an analog reference voltage, reading an offset voltage of said operational amplifier and storing the value of said offset voltage in a memory, and thereafter subtracting said offset voltage values from measured signal values for each of said operational amplifier.

21. The method of claim 20 and further including periodically repeating said coupling, reading and storing to update said offset voltage values.

22. The method of claim 14 further including producing a trip signal in response to determining an arcing fault is present, and latching said trip signal until reception of a reset signal.

23. The method of claim 22 including powering down circuits on said integrated circuit chip when said trip signal is given, using stored energy to maintain the trip signal.

24. A system for determining whether arcing is present in an electrical circuit in response to a sensor signal corresponding to current in said circuit, said system comprising, on a single application specific integrated circuit chip:

means for analyzing said sensor signal to determine the presence of broadband noise in a predetermined range of frequencies, and producing a corresponding output signals, said means for analyzing including passing said sensor signal through at least two bandpass filters having different passbands, and monitoring outputs of said bandpass filters, with comparators having outputs which change state when a predetermined threshold is exceeded;

means for processing said sensor signal and said output signal to determine current peaks and current rise times and to determine, using said current peaks, said current rise times and the presence of broadband noise, whether an arcing fault is present in said circuit, by comparing data corresponding to said current peaks and rise times and broadband noise with preselected data indicative of an arcing fault; and means for incrementing at least one counter in response to the simultaneous presence of components of high frequency in the pass bands of at least two of said bandpass filters.

25. The system of claim 24 including means for incrementing a plurality of counters in response to said sensor signal and said output signal, and means for periodically determining whether an arcing fault is present, including means for monitoring said plurality of counters and means for comparing counts in said counters with one or more preselected counts indicative of an arcing fault.

26. The system of claim 25 wherein means for said counters are implemented in software.

27. The system of claim 24 further including means for providing regulated DC voltage supplies for all of the analog and digital circuits on said integrated circuit chip, using an onboard voltage regulator.

28. The system of claim 24 wherein said means for processing comprises a microprocessor.

29. The system of claim 24 and further including means for synchronizing at least one AND gate with said bandpass filters, for ANDing said comparator outputs.

30. The system of claim 24 further including means for coupling each of a plurality of operational amplifiers with an analog reference voltage, means for reading an offset voltage of said operational amplifier, means for storing the value of said offset voltage in a memory, and means for subtracting said offset voltage values from measured signal values for each of said operational amplifier.

31. The system of claim 24 further including means for producing a trip signal in response to determining an arcing fault is present, and latching said trip signal until reception of a reset signal.

32. The system of claim 31 including means for powering down circuits on said integrated circuit chip when said trip signal is given, using stored energy to maintain the trip signal.

33. A system for determining whether arcing is present in an electrical circuit in response to a sensor signal corresponding to current in said circuit, said system comprising:
 a circuit for analyzing said sensor signal to determine the presence of broadband noise in a predetermined range of frequencies, and producing a corresponding output signal, said circuit for analyzing including at least two bandpass filters having different passbands, and a set of comparators for monitoring outputs of said bandpass filters, said comparators having outputs which change state when a predetermined threshold is exceeded; and
 a controller for processing said sensor signal and said output signal to determine current peaks and current rise time and to determine, using said current peaks and rise times and the presence of broadband noise, whether an arcing fault is present in said circuit, by comparing data corresponding to said current peaks and rise times and broadband noise with preselected data indicative of an arcing fault;
 wherein said circuit for analyzing and said controller are integrated onto a single application specific integrated circuit chip (ASIC), said integrated circuit chip including a test signal buffer which acts as a current source for driving a test winding at a center frequency of each of the bandpass filters.

34. The method of claim 33 wherein said driving is performed in response to an externally generated test mode signal.

35. The method of claim 33 and further including bi-directionally exchanging data between said ASIC and an external processor.

36. A method for determining whether arcing is present in an electrical circuit in response to a sensor signal corresponding to current in said circuit, said system comprising, on a single application specific integrated circuit chip:
 analyzing said sensor signal to determine the presence of broadband noise in a predetermined range of frequencies, and producing a corresponding output signal, said analyzing includes passing said sensor signal through at least two bandpass filters having different passbands, and monitoring outputs of said bandpass filters, with comparators having outputs which change state when a predetermined threshold is exceeded;
 processing said sensor signal and said output signal to determine current peaks and rise times and to determine, using said current peaks and rise times and the presence of broadband noise, whether an arcing fault is present in said circuit, by comparing data corresponding to said current peaks and rise times and broadband noise with preselected data indicative of an arcing fault; and
 driving a test winding at a center frequency of each of the bandpass filters.

37. The system of claim 36 and further including means responsive to a test mode signal for triggering said means for driving.

38. The system of claim 36 and further including means for bi-directionally exchanging data between said ASIC and an external processor.

39. A system for determining whether arcing is present in an electrical circuit in response to a sensor signal corresponding to current in said circuit, said system comprising, on a single application specific integrated circuit chip:
 means for analyzing said sensor signal to determine the presence of broadband noise in a predetermined range of frequencies, and producing a corresponding output signal, said means for analyzing including passing said sensor signal through at least two bandpass filters having different passbands, and monitoring outputs of said bandpass filters, with comparators having outputs which change state when a predetermined threshold is exceeded;
 means for driving a test winding at a center frequency at each of the bandpass filters; and
 means for processing said sensor signal and said output signal to determine current peaks and current rise times and to determine, using said current peaks, said current rise times and the presence of broadband noise, whether an arcing fault is present in said circuit, by comparing data corresponding to said current peaks and rise times and broadband noise with preselected data indicative of an arcing fault.

40. A system for determining whether arcing is present in an electrical circuit in response to a sensor signal corresponding to current in said circuit, said system comprising:
 a circuit for analyzing said sensor signal to determine the presence of broadband noise in a predetermined range of frequencies, and producing a corresponding output signal; and
 a controller for processing said sensor signal and said output signal to determine current peaks and current rise time and to determine, using said current peaks and rise times and the presence of broadband noise, whether an arcing fault is present in said circuit, by comparing data corresponding to said current peaks and rise times and broadband noise with preselected data indicative of an arcing fault;

wherein said circuit for analyzing and said controller are integrated onto a single application specific integrated circuit chip (ASIC), said integrated circuit chip comprising a processor responsive to an externally generated test mode signal for causing said test signal buffer to generate a signal for driving said test winding.

* * * * *